United States Patent
Benson

(10) Patent No.: US 8,033,920 B1
(45) Date of Patent: Oct. 11, 2011

(54) HIGH TORQUE, FLEXIBLE, DUAL, CONSTANT VELOCITY, BALL JOINT ASSEMBLY FOR MUD MOTOR USED IN DIRECTIONAL WELL DRILLING

(76) Inventor: Todd Benson, Austin, TX (US)

(*) Notice: Subject to any disclaimer, the term of this patent is extended or adjusted under 35 U.S.C. 154(b) by 286 days.

(21) Appl. No.: 12/384,834

(22) Filed: Apr. 10, 2009

(51) Int. Cl.
*F16D 3/221* (2006.01)
(52) U.S. Cl. ......... 464/141; 464/167; 464/906; 175/107
(58) Field of Classification Search .......... 464/106, 464/139–141, 172, 906, 167; 175/107
See application file for complete search history.

(56) References Cited

U.S. PATENT DOCUMENTS

| | | | | |
|---|---|---|---|---|
| 2,796,749 | A * | 6/1957 | Warner | 464/172 |
| 3,310,960 | A * | 3/1967 | Cull | 464/906 |
| 5,160,299 | A * | 11/1992 | Sweeney | 464/141 |
| 7,648,419 | B2 * | 1/2010 | Jacob et al. | 464/906 |
| 2002/0177485 | A1 * | 11/2002 | Cermak et al. | 464/167 |

FOREIGN PATENT DOCUMENTS

| | | | |
|---|---|---|---|
| FR | 785242 | * | 5/1935 |
| GB | 390438 | * | 4/1933 |

* cited by examiner

*Primary Examiner* — Gregory Binda
*Assistant Examiner* — Josh Skroupa
(74) *Attorney, Agent, or Firm* — Edwin H. Crabtree; Ramon L. Pizarro

(57) ABSTRACT

A flexible, dual ball joint assembly used for increasing the wear life of a mud motor. The ball joint assembly includes an drive shaft with a drive shaft hollow ball joint. An outer circumference of the hollow ball joint includes a plurality of equally spaced apart drive shaft ball bearings. An inner circumference, inside the hollow ball joint, includes a plurality of equally spaced apart drive shaft grooves. Also, the ball joint assembly includes an annular shaped torque coupler with a torque coupler ball joint. An outer circumference of the torque coupler ball joint includes a plurality of equally spaced apart torque coupler ball bearings. The torque coupler ball bearings are received in the drive shaft grooves for providing lateral movement between the drive shaft and the torque coupler. An outer circumference of the torque coupler next to the torque coupler ball joint includes a plurality of torque coupler lobes equally spaced apart therearound. Further, the ball joint assembly includes a sliding torque sleeve used to secure the drive shaft to the torque coupler during the operation of the ball joint assembly.

20 Claims, 5 Drawing Sheets

HIGH TORQUE, FLEXIBLE, DUAL, CONSTANT VELOCITY, BALL JOINT ASSEMBLY FOR MUD MOTOR USED IN DIRECTIONAL WELL DRILLING

BACKGROUND OF THE INVENTION (a) Field of the Invention

This invention relates generally to an improved mud motor used in directional drilling of oil and gas wells and more particularly, but not by way of limitation, to an improved flexible, dual, constant velocity or CV, ball joint assembly used with an drive shaft for increased wear life of a mud motor.

(b) Discussion of Prior Art

In directional oil and gas drilling down-hole, a drill pipe string includes a mud motor with a fluid drive rotor inside a stator. The rotor and stator are disposed inside the mud motor's housing and is driven by high pressure fluid. The rotor provides high torque and eccentric, rotation motion for driving the mud motor. The mud motor is used for rotating a drill bit at the end of the drill pipe string. Also inside the mud motor housing is a drive shaft. The drive shaft is used for compensating for eccentric lateral movement from the fluid drive rotor as well as a bend in a mud motor housing of up to 3 degrees. Opposite ends of the drive shaft include universal ball joints with ball bearings for making the lateral movement. The subject invention is a substantial improvement of a flexible universal joint at opposite ends of the drive shaft in the mud motor housing to greatly reduce wear under high torque and compression loading.

In U.S. Pat. Nos. 4,772,246 to Wenzel and 5,704,838 to Teale, universal joint assemblies are disclosed and used with a down-hole mud motor. The prior art patent references don't disclose the unique features and function of the subject high torque, dual, constant velocity, ball joint assembly with multiple rings of ball bearings used with a drive shaft inside a down-hole mud motor housing.

SUMMARY OF THE INVENTION

In view of the foregoing, it is a primary objective of the subject invention to provide a high torque, flexible, dual ball joint assembly for improved wear life inside a mud motor housing. Heretofore, mud motors and other high torque, constant velocity, ball joint assemblies are supported in limited radial space inside the mud motor housing. Traditional constant velocity or CV type joint assemblies have 6 to 8 contact points using ball or roller bearings. These type assemblies quite often wear prematurely and ultimately fail under high torque and compression loads. The subject invention greatly increases the amount of contact points in a universal ball joint assembly using multiple rings of ball bearings thus preventing premature failure under high torque loads. For example, the contact points are increased by at least twice or more.

The subject ball joint assembly includes a drive shaft mounted inside a mud motor housing. The drive shaft is part of a mud motor. A first end of the drive shaft includes a drive shaft hollow ball joint. An outer circumference of the hollow ball joint includes a plurality of equally spaced apart circular holes for receiving drive shaft ball bearings. An inner circumference, inside the hollow ball joint, includes a plurality of equally spaced apart drive shaft grooves. The drive shaft grooves are parallel to the length of the drive shaft.

Also, the ball joint assembly includes an annular shaped torque coupler. A first end of the torque coupler includes a torque coupler solid ball joint. An outer circumference of the torque coupler solid ball joint includes a plurality of equally spaced apart circular holes for receiving torque coupler ball bearings. The torque coupler ball bearings are received in the drive shaft grooves for providing lateral movement between the drive shaft and the torque coupler. An outer circumference of the torque coupler next to the solid ball joint includes a plurality of semi-circular torque coupler lobes equally spaced apart therearound.

The torque coupler also includes a threaded male second end used for attaching the ball joint assembly to an up-hole bearing mandrel used for attaching the mud motor to the stator and rotor. Also, in another embodiment, the torque coupler includes a treaded female second end used for attaching the ball joint assembly to a down-hole bearing mandrel which in turn is connected to a down-hole drill bit adapter attached to a drill bit.

Further, the ball joint assembly includes a sliding torque sleeve received around the first end of the drive shaft and the first end of the torque coupler. An inner circumference of the torque sleeve includes equally spaced apart torque sleeve grooves therearound. The drive shaft ball bearings are received in the torque sleeve grooves for providing additional lateral movement between the drive shaft and the torque coupler. The torque coupler lobes are also received in the torque sleeve grooves. The sliding torque sleeve is used to secure the drive shaft to the torque coupler during the operation of the ball joint assembly and holding lubricant therein.

These and other objects of the present invention will become apparent to those familiar with the down-hole drill string mud motors and universal joints used with mud motors when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figures 1, 1A:
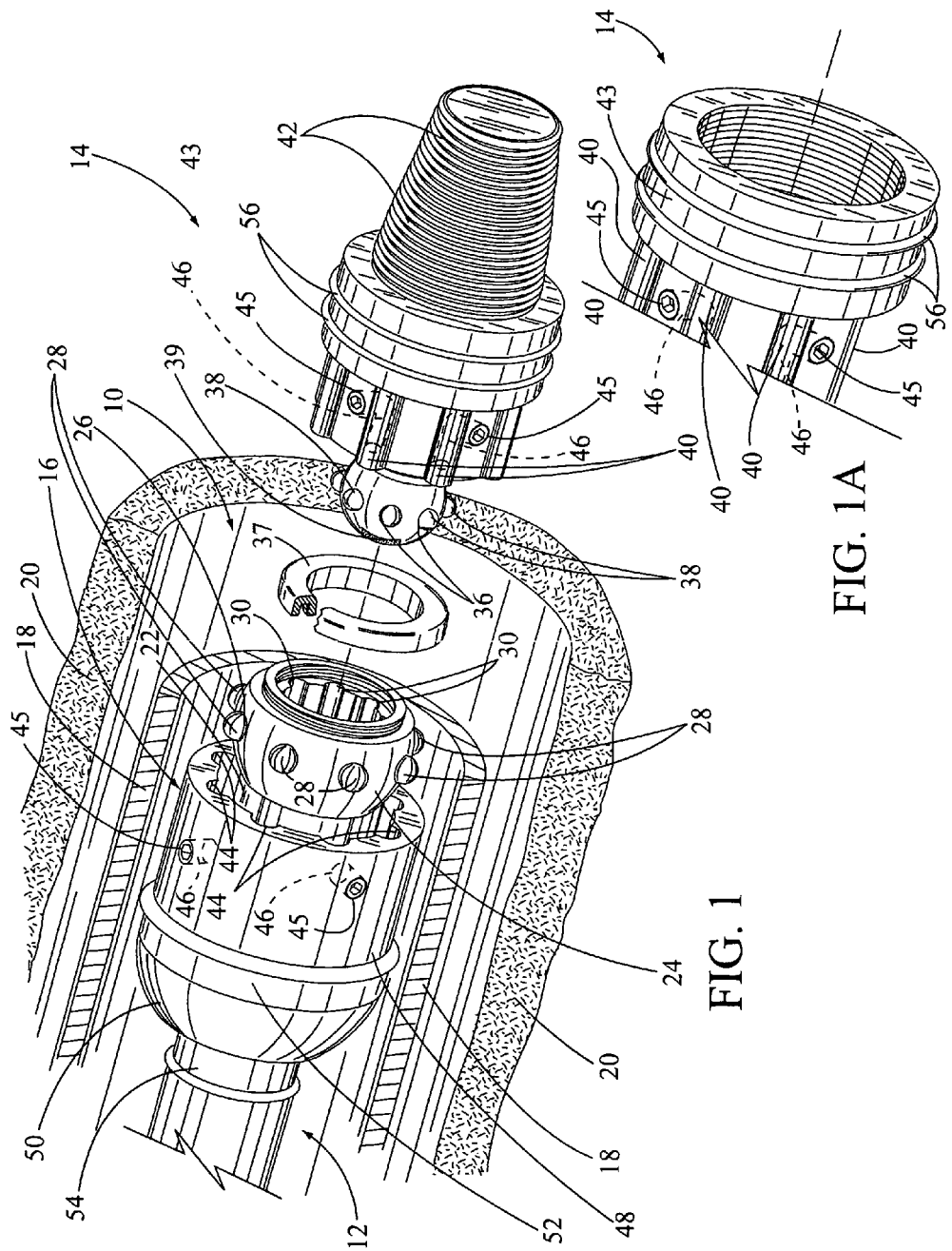
FIG. 1 is an exploded perspective view of the subject flexible, dual ball joint assembly and illustrating a first end of a drive shaft with a drive shaft hollow ball joint, a first end of a torque coupler with a torque coupler solid ball joint and a surrounding sliding torque sleeve.
FIG. 1A is a partial perspective view of another embodiment of the torque coupler having a threaded female second end for attaching to a down-hole bearing mandrel and a drill bit adapter.

In FIG. 1, the subject flexible, dual ball joint assembly is shown having general reference numeral 10. The ball joint assembly 10 broadly includes three key elements, which is a drive shaft, having a general reference numeral 12, an annular shaped torque coupler, having a general reference numeral 14, and a sliding torque sleeve, having a general reference numeral 16. The drive shaft 12, the torque coupler 14 and the torque sleeve 16 are part of a down-hole mud motor disposed inside a mud motor housing 18. The housing 18 is shown in cross-section. The complete mud motor is not shown in the drawings. The mud motor is received inside a portion of a drill hole 20, also shown in cross-section.

The mud motor includes two of the subject ball joint assemblies 10 mounted on opposite ends of the motor. An up-hole ball joint assembly 10 is attached to a up-hole bearing mandrel attached to the rotor and stator mounted inside the housing 18. A down-hole ball joint assembly 10 is attached to a down-hole bearing mandrel attached to a drill bit adapter, which is secured to the drill bit.

A first end 22 of the drive shaft 12 includes a drive shaft hollow ball joint 24. A circumference of the hollow ball joint 24 includes a plurality of equally spaced apart circular holes 26 for receiving drive shaft ball bearings 28. An inner circumference, inside the hollow ball joint 24, includes a plurality of equally spaced apart drive shaft grooves 30. The drive shaft grooves 30 are parallel to the length of the drive shaft 12.

A first end 32 of the torque coupler 14 includes a torque coupler solid ball joint 34. An outer circumference of the solid ball joint 34 includes a plurality of equally spaced apart circular holes 36 for receiving torque coupler ball bearings 38. The end of the solid ball joint 34 includes a first wear resistant insert pad 39 for increasing the wear life of the ball joint. The torque coupler ball bearings 38 are received in the drive shaft grooves 30 for providing lateral movement between the drive shaft 12 and the torque coupler 14. An outer circumference of the torque coupler 14 next to the solid ball joint 36 includes a plurality of semi-circular torque coupler lobes 40 equally spaced apart therearound.

It should be noted, the ball bearings 38 are held in place in the drive shaft grooves 30 using a ball bearing ring retainer 37. The ring retainer 37 is threaded onto the portion of the outer circumference of the drive shaft hollow ball joint 24 after the ball bearings 38 are received inside the drive shaft grooves 30 and removed when the torque coupler 14 is disassembled from the drive shaft 12 when performing maintenance on the ball joint assembly 10.

The torque coupler 14 also includes a threaded male second end 42 used for attaching the up-hole ball joint assembly 10 to the up-hole bearing mandrel, which is attached to the rotor and stator inside the housing 18.

A second embodiment of the torque coupler 14 includes a threaded female second end 43 used for attaching the down-hole ball joint assembly 10, on the opposite end of the drive shaft 12, to a down-hole bearing mandrel attached to a drill bit adapter secured to a drill bit. The two bearing mandrels, rotor and stator, drill bit adapter and drill bit are not shown in the drawings.

The sliding torque sleeve 16 is received around the first end 32 of the drive shaft 12 and the first end 32 of the torque coupler 14. An inner circumference of the torque sleeve 16 includes equally spaced apart torque sleeve grooves 44 therearound. The drive shaft ball bearings 28 are received in the torque sleeve grooves 44 for providing additional lateral movement between the drive shaft 12 and the torque coupler 14. The torque coupler lobes 40 are also received in the torque sleeve grooves 44. The sliding torque sleeve 16 includes four or more set screws 45 received in threaded holes 46 and used to secure the drive shaft 12 to the torque coupler 14 during the operation of the ball joint assembly 10 and holding lubricant therein. Prior to securing the torque sleeve 16 to the torque coupler 14, the threaded holes 46 used to receive the set screws 45 can be used for pumping a grease lubricant inside the ball joint assembly 10.

On a second end 48 of the sliding torque sleeve 16 is mounted a flexible boot 50. A first boot band 52 is used to secure one end of the boot 50 to the sleeve 16. A second boot band 54 is used to secure an opposite end of the boot 50 to the drive shaft 12. The boot 50 provides for a flexible housing for holding lubricant inside one end of the ball joint assembly 10 during it's operation.

Figure 2:
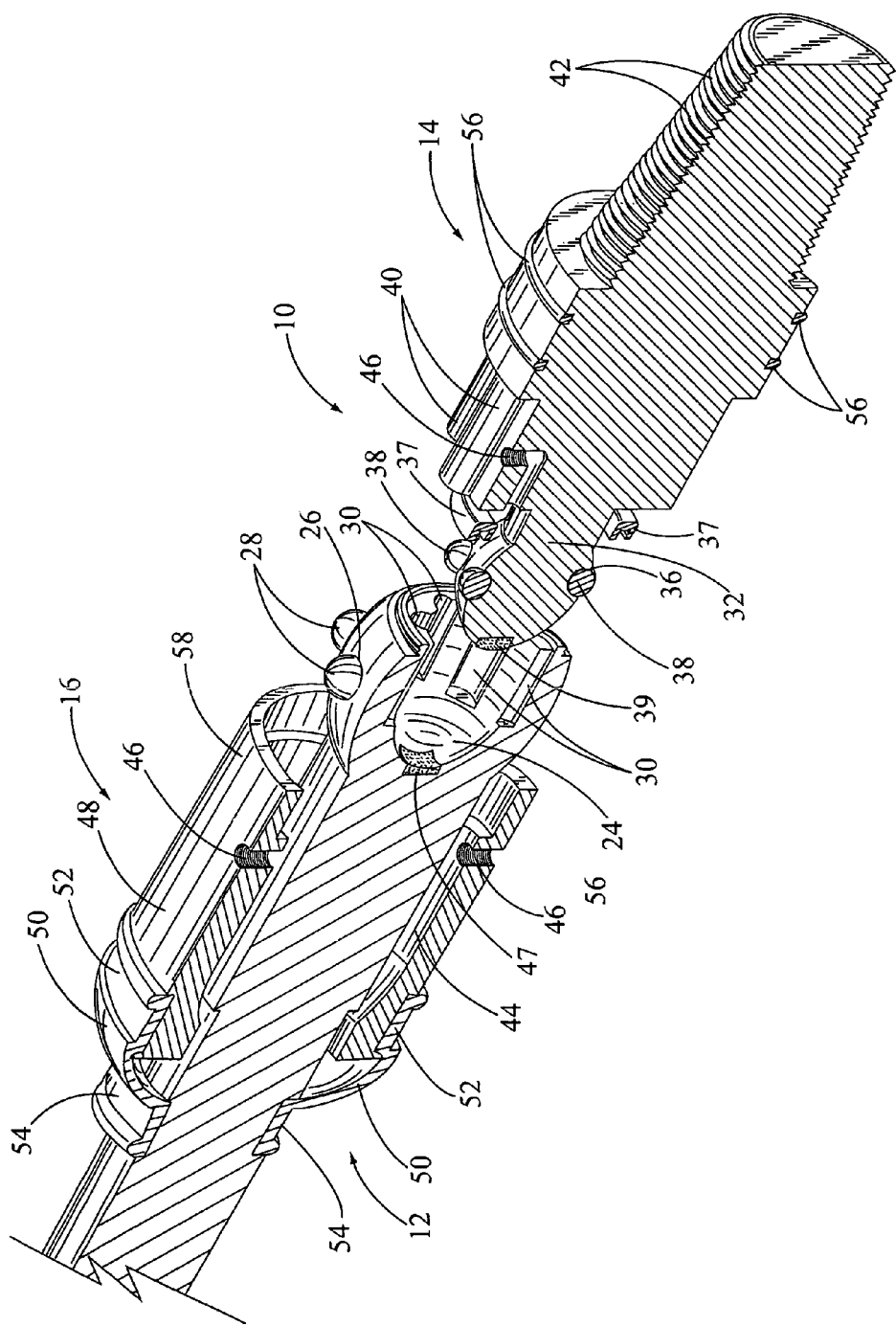
FIG. 2 is a sectional, perspective view of the exploded view of the ball joint assembly shown in FIG. 1.

In FIG. 2, a sectional, perspective view of the exploded view of the ball joint assembly 10 is shown. In this drawing, a portion of the first end 22 of the drive shaft 12 is seen received through the sliding torque sleeve 16. Also, the drive shaft hollow ball joint 24 is positioned for receiving the torque coupler solid ball joint 34 therein with the torque coupler ball bearings 38 sliding into the drive shaft grooves 36. The inside of the hollow ball joint 24 is shown with a second wear-resistant insert pad 47 for mating with the first wear-resistant insert pad 39 in the end of the solid ball joint 34.

It should be noted that the hollow ball joint 24 and the drive shaft grooves 36 are machined so that the torque coupler ball bearings 38 are received below and seated between the drive shaft ball bearings 28 at an angle of 22½ degrees. Also, once the torque coupler solid ball joint 34 is seated inside the drive shaft hollow ball joint 24, the sliding torque sleeve 16 is moved from the left to the right with the drive shaft ball bearings 28 and the torque coupler lobes 40 received inside the torque sleeve grooves 44. Also shown in the sectional view of the torque coupler 14 are "O" ring seals 56 disposed around its outer circumference to prevent high pressure, mud motor drilling fluid from leaking into the inside the ball joint assembly 10.

Figure 3:
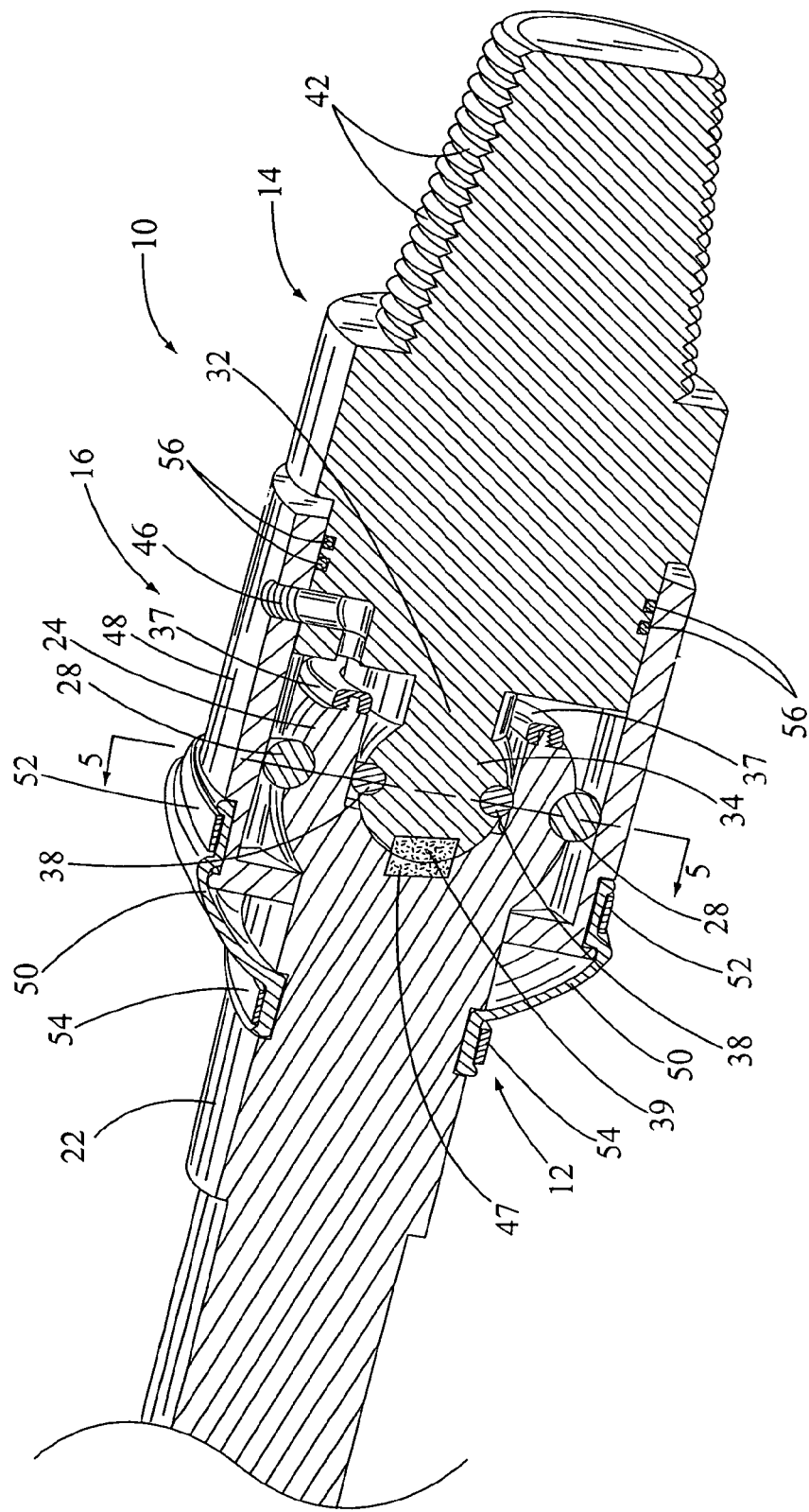
FIG. 3 is a sectional, perspective view of the ball joint assembly with the torque couple ball joint received inside the drive shaft hollow ball joint and the sliding torque sleeve received around the first ends of the drive shaft and the torque coupler.

In FIG. 3, a sectional, perspective view of the dual, ball joint assembly 10 is shown in it's assembled form. The torque coupler ball joint 34 is illustrated received inside the drive shaft hollow ball joint 24. The sliding torque sleeve 16 is shown received around the first end 22 of the drive shaft 12 and the first end 32 of the torque coupler 14. Also shown in this illustration is the first wear-resistant insert pad 39 in the end of the solid ball joint 34 engaging the second wear-resistant insert pad 47 inside the hollow ball joint 24. The first and second wear-resistant insert pads 39 and 47 provide for increased wear life on the joint assembly 10 under heavy compression loads placed on the mud motor during a drilling operation.

Figure 4:
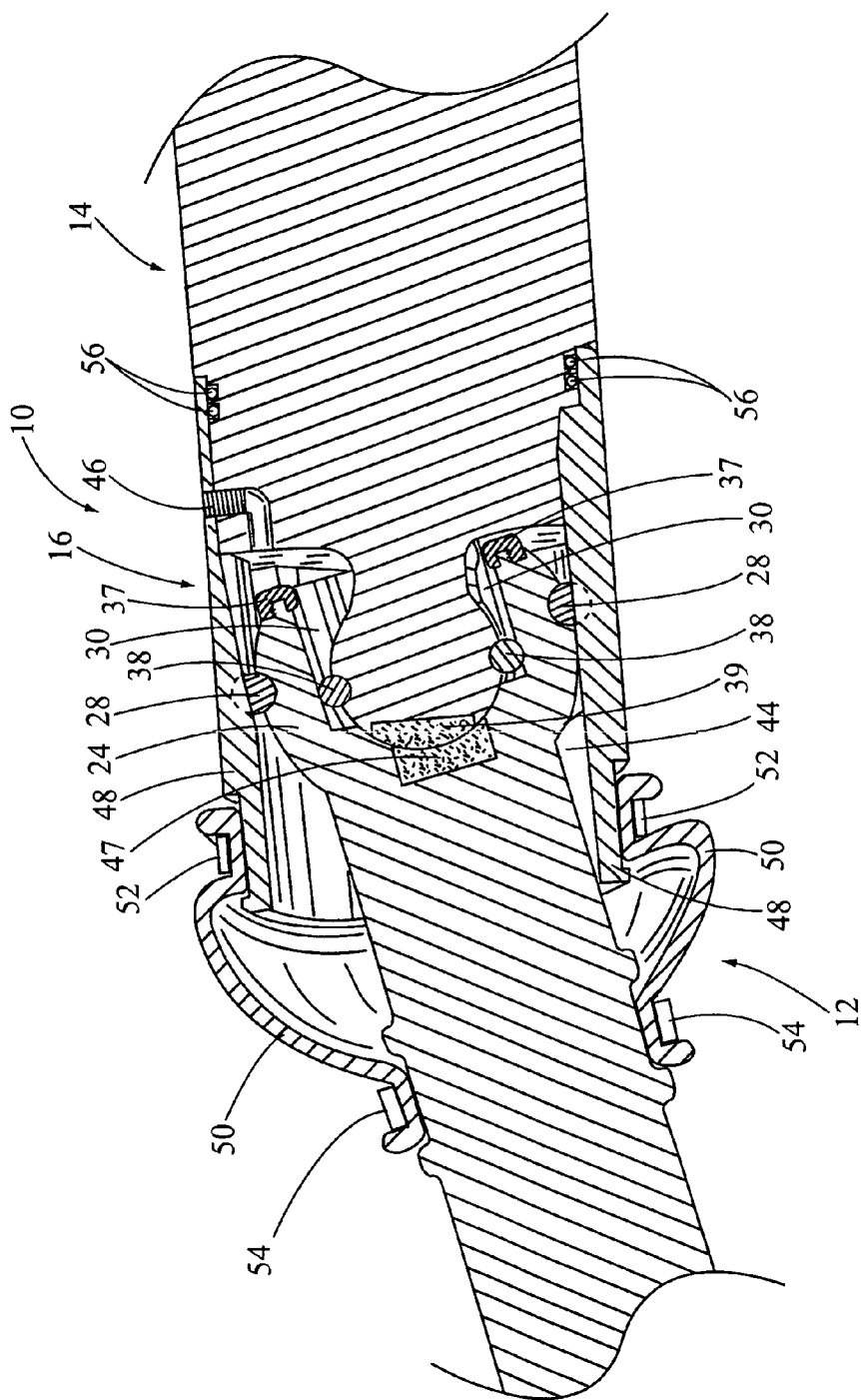
FIG. 4 is side sectional view of the ball joint assembly with the drive shaft hollow ball joint pivoting on the solid, torque couple ball joint.

In FIG. 4, a side sectional view of the ball joint assembly 10 is shown. In this drawing, the drive shaft 12 and the drive shaft hollow ball joint 24 are shown pivoting upwardly and laterally and moving the solid, torque coupler ball joint 34 and torque coupler 14 upwardly at an angle. This angle helps compensate for the erratic movement of the rotor inside the stator and the bend in the mud motor housing.

Figure 5:
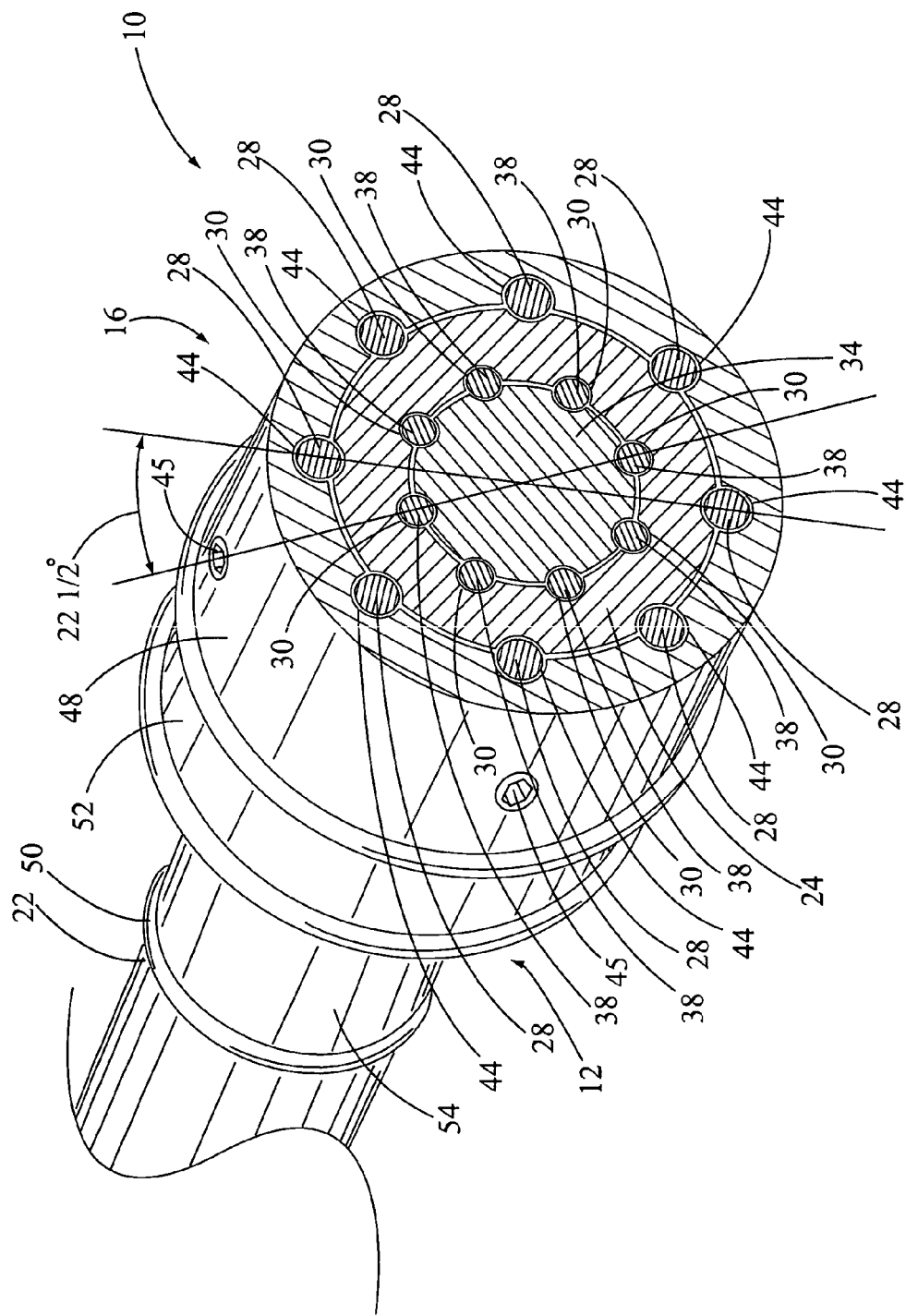
FIG. 5 is a cross-sectional view of the ball joint assembly taken along axis line 5-5 shown in FIG. 3.

In FIG. 5, a cross-sectional view of the ball joint assembly 10 is illustrated and taken along axis 5-5 shown in FIG. 3. In this drawing, the increased contact area of the ball bearings used in the ball joint assembly 10 can be clearly seen. For example, eight drive shaft ball bearings 28 are shown riding inside the torque sleeve grooves 44 for providing eccentric movement between the drive shaft hollow ball joint 24 and the inner circumference of the sliding torque sleeve 16. Also, eight torque coupler ball bearings 38 are shown offset at an angle of 22½ degrees and below the ball bearings 28. Further, the torque coupler ball bearings 38 are shown riding inside the drive shaft grooves 30 for providing eccentric movement between the drive shaft hollow ball joint 24 and the torque coupler solid ball joint 34. As mentioned above, the substantial increase of point contact of the sixteen ball bearings 28 and 38 provides for ease in eccentric movement and increased wear life inside the subject flexible, dual ball joint assembly 10.

Also, the offset drive shaft ball bearings 28, at an angle of 22½ degrees from the torque coupler ball bearings 38, increases the mass in the drive shaft hollow ball joint 24 between the ball joint 24 and the torque coupler solid ball joint 34. This key feature of the location of the ball bearings, above and below each other, provides for an increase in the overall strength of the ball joint assembly 10 during its eccentric motion under heavy torque loading.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A flexible, dual ball joint assembly for increasing the wear life of a mud motor used in oil and gas directional drilling, the ball joint assembly comprising:
   a drive shaft having a drive shaft hollow ball joint, an outer circumference of the hollow ball joint having drive shaft ball bearings therearound, an inner circumference inside the hollow ball joint having drive shaft grooves therearound;
   a torque coupler having a torque coupler ball joint, an outer circumference of the torque coupler ball joint having torque coupler ball bearings therearound, the torque coupler ball bearings received in the drive shaft grooves for providing lateral movement between the drive shaft and the torque coupler, an outer circumference of the torque coupler having torque coupler lobes therearound; and
   a torque sleeve received around the drive shaft hollow ball joint and around the torque coupler ball joint, an inner circumference of the torque sleeve having torque sleeve grooves therearound, the drive shaft ball bearings and the torque coupler lobes received in the torque sleeve grooves.

2. The ball joint assembly as described in claim 1 wherein the drive shaft has a first end with the drive shaft hollow ball joint thereon, an outer circumference of the hollow ball joint having a plurality of equally spaced apart drive shaft ball bearings therearound, an inner circumference inside the hollow ball joint having a plurality of equally spaced apart drive shaft grooves therearound, the drive shaft grooves parallel to the length of the drive shaft.

3. The ball joint assembly as described in claim 2 wherein the torque coupler is an annular shaped torque coupler having a first end with the torque coupler ball joint, an outer circumference of the torque coupler ball joint having a plurality of equally spaced apart torque coupler ball bearings therearound, the torque coupler ball bearings received in the drive shaft grooves for providing lateral movement between the drive shaft and the torque coupler, an outer circumference of the torque coupler next to the torque coupler ball joint having a plurality of semi-circular torque coupler lobes equally spaced apart therearound.

4. The ball joint assembly as described in claim 3 wherein the torque sleeve is a sliding torque sleeve received around the first end of the drive shaft and around the first end of the torque coupler, an inner circumference of the torque sleeve includes equally spaced apart torque sleeve grooves therearound, the drive shaft ball bearings received in the torque sleeve grooves for providing additional lateral movement between the drive shaft and the torque coupler, the torque coupler lobes received in the torque sleeve grooves.

5. The ball joint assembly as described in claim 4 wherein the sliding torque sleeve includes a plurality of set screws received in a side thereof for securing the torque sleeve to the drive shaft and the torque coupler.

6. The ball joint assembly as described in claim 1 further including a first wear-resistant insert pad mounted inside the drive shaft hollow ball joint and a second wear-resistant insert pad mounted on the torque coupler ball joint.

7. The ball joint assembly as described in claim 1 further including a plurality of "O" ring seals disposed around the inner circumference of the torque sleeve for engaging the outer circumference of the drive shaft and the torque coupler and providing a seal therearound.

8. The ball joint assembly as described in claim 1 further including a flexible boot, one end of the boot received around the outer circumference of a second end of the torque sleeve and secured thereto, an opposite end of the boot received around a portion of the drive shaft and secured thereto.

9. A flexible, dual ball joint assembly for increasing the wear life of a mud motor used in oil and gas directional drilling, the ball joint assembly comprising:
   a drive shaft having a first end with a drive shaft hollow ball joint, an outer circumference of the hollow ball joint having a plurality of equally spaced apart drive shaft ball bearings therearound, an inner circumference inside the hollow ball joint having a plurality of equally spaced apart drive shaft grooves therearound, the drive shaft grooves parallel to the length of the drive shaft;
   a torque coupler having a first end with a torque coupler solid ball joint, an outer circumference of the torque coupler solid ball joint having a plurality of equally spaced apart torque coupler ball bearings therearound, the torque coupler ball bearings received in the drive shaft grooves for providing lateral movement between the drive shaft and the torque coupler, an outer circumference of the torque coupler next to the solid ball joint having a plurality of semi-circular torque coupler lobes equally spaced apart therearound; and
   a torque sleeve received around the first end of the drive shaft and around the first end of the torque coupler, an inner circumference of the torque sleeve includes equally spaced apart torque sleeve grooves therearound, the drive shaft ball bearings received in the torque sleeve grooves for providing additional lateral movement between the drive shaft and the torque coupler, the torque coupler lobes received in the torque sleeve grooves, whereby the torque sleeve is used to secure the drive shaft to the torque coupler during the operation of the ball joint assembly.

10. The ball joint assembly as described in claim 9 wherein the plurality of equally spaced apart drive shaft ball bearings are offset above the plurality of equally spaced apart torque coupler ball bearings for increasing the mass in the drive shaft hollow ball joint and the overall strength of the ball joint assembly.

11. The ball joint assembly as described in claim 9 wherein the sliding torque sleeve includes at least four set screws received in a side thereof for securing the torque sleeve to the drive shaft and the torque coupler.

12. The ball joint assembly as described in claim 9 further including a first wear-resistant insert pad mounted inside the hollow ball joint and a second wear-resistant insert pad mounted on the torque coupler ball joint.

13. The ball joint assembly as described in claim 9 further including a plurality of "O" ring seals disposed around the inner circumference of the sliding torque sleeve for engaging the outer circumference of the torque coupler and providing a seal therearound.

14. The ball joint assembly as described in claim 9 further including a flexible boot, one end of the boot received around the outer circumference of a second end of the torque sleeve and secured thereto using a first boot band, an opposite end of the boot received around a portion of the drive shaft and secured thereto using a second boot band.

15. The ball joint assembly as described in claim 9 further including a ball bearing retainer ring, the retainer ring threaded onto the outer circumference of the drive shaft hollow ball joint for holding the torque coupler ball bearings in the drive shaft grooves.

16. A flexible, dual ball joint assembly for increasing the wear life of a mud motor used in oil and gas directional drilling, the ball joint assembly comprising:

a drive shaft having a first end with a drive shaft hollow ball joint, an an outer circumference of the hollow ball joint having at least eight spaced drive shaft ball bearings therearound, an inner circumference inside the hollow ball joint having at least eight equally spaced apart drive shaft grooves therearound, the drive shaft grooves parallel to the length of the drive shaft;

a torque coupler having a first end with a torque coupler ball joint, an outer circumference of the torque coupler solid ball joint having at least eight equally spaced apart torque coupler ball bearings therearound, the torque coupler ball bearings received in the drive shaft grooves for providing lateral movement between the drive shaft and the torque coupler, an outer circumference of the torque coupler next to the solid ball joint having a at least eight semi-circular torque coupler lobes equally spaced apart therearound; and a torque sleeve received around the first end of the drive shaft and around the first end of the torque coupler, an inner circumference of the torque sleeve includes at least eight equally spaced apart torque sleeve grooves therearound, the drive shaft ball bearings received in the torque sleeve grooves for providing additional lateral movement between the drive shaft and the torque coupler, the torque coupler lobes received in the torque sleeve grooves, the torque sleeve having a plurality of set screws for securing the drive shaft to the torque coupler during the operation of the ball joint assembly.

17. The ball joint assembly as described in claim 16 further including a first wear-resistant insert pad mounted inside the hollow ball joint and a second wear-resistant insert pad mounted on the torque coupler ball joint.

18. The ball joint assembly as described in claim 16 further including a plurality of "O" ring seals disposed around the inner circumference of the sliding torque sleeve for engaging the outer circumference of the torque coupler and providing a seal therearound.

19. The ball joint assembly as described in claim 16 further including a flexible boot, one end of the boot received around the outer circumference of a second end of the torque sleeve and secured thereto using a first boot band, an opposite end of the boot received around a portion of the drive shaft and secured thereto using a second boot band.

20. The ball joint assembly as described in claim 16 further including a ball bearing retainer ring, the retainer ring threaded onto the outer circumference of the drive shaft hollow ball joint for holding the torque coupler ball bearings in the drive shaft grooves.

* * * * *